US008816551B2

(12) United States Patent
Oishi

(10) Patent No.: US 8,816,551 B2
(45) Date of Patent: Aug. 26, 2014

(54) ROTARY ACTUATOR

(71) Applicant: Denso Corporation, Kariya (JP)

(72) Inventor: Kenichi Oishi, Toyokawa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/790,497

(22) Filed: Mar. 8, 2013

(65) Prior Publication Data

US 2013/0234548 A1    Sep. 12, 2013

(30) Foreign Application Priority Data

Mar. 9, 2012   (JP) ................... 2012-053088

(51) Int. Cl.
     *H02K 11/00*      (2006.01)
     *H02K 29/08*      (2006.01)
     *H02K 5/22*      (2006.01)
     *H02K 15/02*      (2006.01)

(52) U.S. Cl.
     CPC ................ *H02K 5/225* (2013.01); *H02K 29/08* (2013.01); *H02K 15/02* (2013.01)
     USPC .................. 310/71; 29/596; 29/598

(58) Field of Classification Search
     USPC ....................... 310/71; 29/596–598
     See application file for complete search history.

(56) References Cited

U.S. PATENT DOCUMENTS

| | | | | |
|---|---|---|---|---|
| 5,382,855 | A | * | 1/1995 | Cousin ........................... 310/71 |
| 7,598,637 | B2 | * | 10/2009 | Niehaus et al. ................. 310/71 |
| 7,847,447 | B2 | | 12/2010 | Kume et al. |
| 2003/0173843 | A1 | * | 9/2003 | Sakai et al. ..................... 310/71 |
| 2004/0007935 | A1 | | 1/2004 | Kimura et al. |
| 2007/0145839 | A1 | * | 6/2007 | Kimura et al. ............. 310/68 B |

FOREIGN PATENT DOCUMENTS

| | | |
|---|---|---|
| JP | 02-247987 | 10/1990 |
| WO | WO 2008/108431 | 9/2008 |

OTHER PUBLICATIONS

Office Action (1 page) dated Feb. 12, 2014, issued in corresponding Japanese Application No. 2012-053088 and English translation (2 pages).

* cited by examiner

*Primary Examiner* — Tran Nguyen
*Assistant Examiner* — Leda Pham
(74) *Attorney, Agent, or Firm* — Nixon & Vanderhye PC

(57) ABSTRACT

A rotary actuator has a connecting member for electrically connecting a terminal to a fixing land. The connecting member is composed of a base portion, a pair of leg portions, a pair of deformation suppressing portions and a pair of holding portions. The terminal is inserted through the base portion. Each of the leg portions extends from the base portion in a radial outward direction. The leg portion is fixed to the land portion by soldering. Each of the deformation suppressing portions extends from an outer-side end of the leg portion toward the terminal. Each of the holding portions extends from an inner-side end toward a forward end of the terminal. The holding portions elastically hold the terminal between them.

10 Claims, 9 Drawing Sheets

ROTARY ACTUATOR

CROSS REFERENCE TO RELATED APPLICATION

This application is based on Japanese Patent Application No. 2012-053088 filed on Mar. 9, 2012, the disclosure of which is incorporated herein by reference.

FIELD OF TECHNOLOGY

The present disclosure relates to a rotary actuator.

BACKGROUND

It is known in the art for a rotary actuator having an electric motor that a rotational angle of a rotor of the electric motor is detected by a rotational angle detecting device, such as a magnetic sensor. For example, in a rotary actuator as disclosed in Japanese Patent Publication No. 2009-177982 (corresponding to U.S. Pat. No. 7,847,447 B2), a magnetic sensor is mounted on a circuit board fixed to an inner wall of a housing. Multiple terminals projecting from the inner wall of the housing are electrically connected to the circuit board by soldering. The magnetic sensor is connected to an outside power source and an electronic control unit via wirings and the terminals.

In the rotary actuator of the above prior art, it is necessary to connect the terminals to the circuit board by soldering when the circuit board is assembled in the housing. It is not easy to assemble the circuit board in the housing and such an assembling process takes a lot of time.

SUMMARY OF THE DISCLOSURE

The present disclosure is made in view of the above problem. It is an object of the present disclosure to provide a rotary actuator, according to which a circuit board can be easily assembled in a housing in a shorter time.

According to a feature of the present disclosure, a rotary actuator is composed of; a rotor; a stator; a housing; a rotational angle detecting unit; a circuit board; a terminal; and a connecting member. The rotor is rotatable. The stator generates magnetic field to be acted on the rotor so as to rotate the rotor. The housing rotatably supports the rotor and firmly supports the stator.

The rotational angle detecting unit detects rotational angle of the rotor upon receiving electric power. The circuit board is fixed to the housing and has a wire connected to the rotational angle detecting unit, which is mounted to the circuit board. The terminal extends from an inner wall of the housing toward the circuit board and is inserted through a through-hole formed in the circuit board. The connecting member is provided at a side of the circuit board opposite to the inner wall of the housing for electrically connecting the terminal to the wire.

The connecting member is composed of; a base portion; a pair of leg portions; a pair of deformation suppressing portions; and a pair of holding portions. The terminal is inserted through the base portion. The leg portions are integrally formed with the base portion at an outer periphery of the base portion and the leg portions extend from the base portion in a radial outward direction. The leg portions are electrically connected to the wire by soldering. The deformation suppressing portions are formed at a side of the leg portions opposite to the base portion and each of the deformation suppressing portions extends from the leg portion toward the terminal. Each of the holding portions extends from an inner-side end of the deformation suppressing portion toward a forward end of the terminal for elastically holding the terminal between the pair of the holding portions.

According to the above feature, when the circuit board is assembled to the housing, the connecting member is already fixed to the circuit board. Therefore, the terminal is simply inserted through a space between the holding portions of the connecting member, so that the electrical connection between the terminal and the circuit board is completed. As a result, the circuit board can be assembled to the housing in a simple manner and in a short time.

The connecting member is mounted to the circuit board at the same time when the magnetic sensor (for example, the hall IC) is mounted to the circuit board by reflow soldering. Therefore, a number of manufacturing steps is not increased, even when the connecting member is additionally mounted to the circuit board.

The deformation suppressing portions are formed between the holding portions and the leg portions. Therefore, the deformation of the holding portions is hardly transmitted to the leg portions. It is, therefore, possible to avoid such a situation that the leg portions may be separated from the circuit board by the deformation force transmitted from the holding portions to the leg portions.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
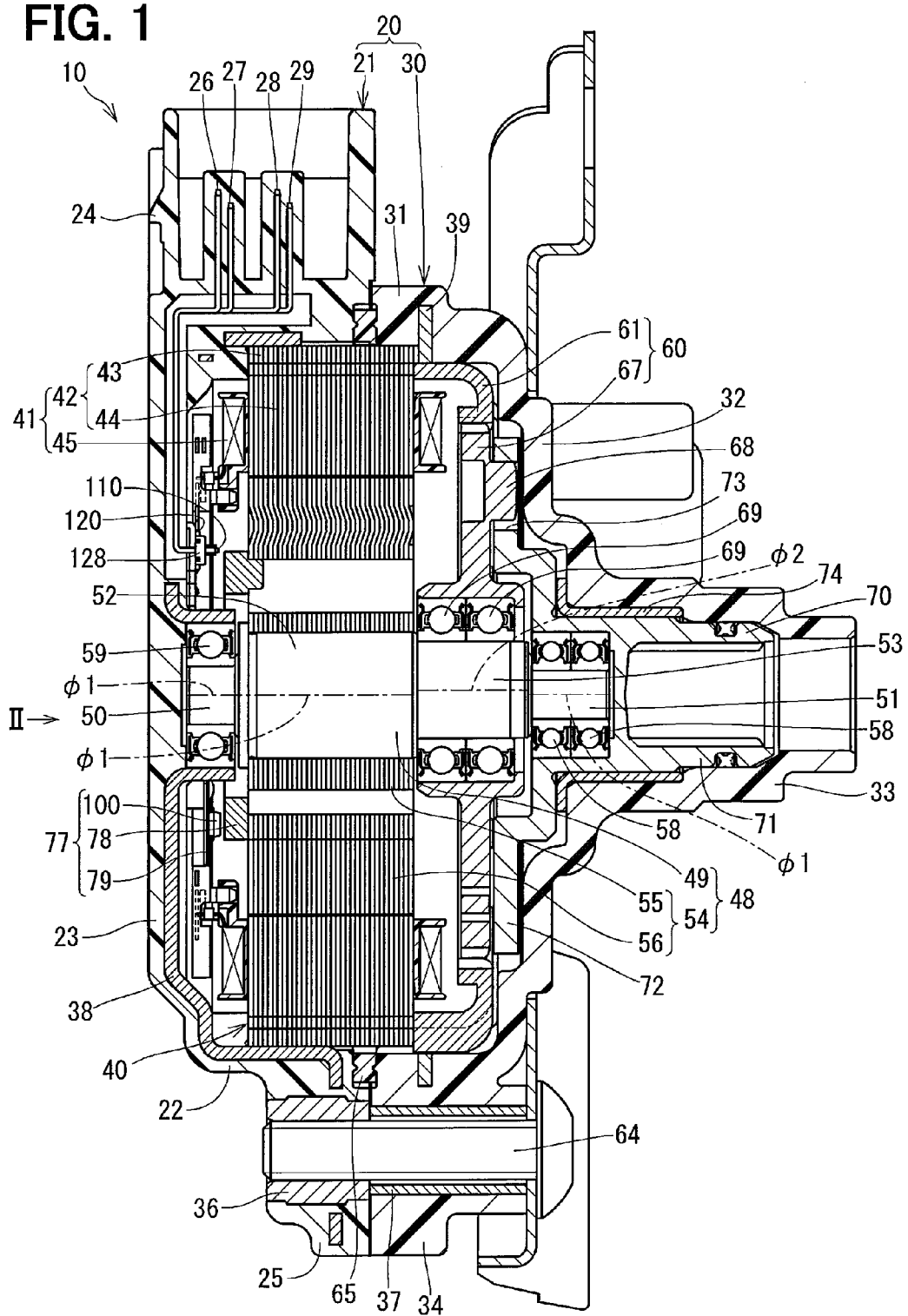
FIG. 1 is a schematic cross sectional view showing a rotary actuator according to a first embodiment of the present disclosure.

The present disclosure will be explained hereinafter by way of multiple embodiments. The same reference numerals are given to the same or similar portions and/or structures throughout the embodiments, for the purpose of eliminating repeated explanation.

First Embodiment

Figure 2:
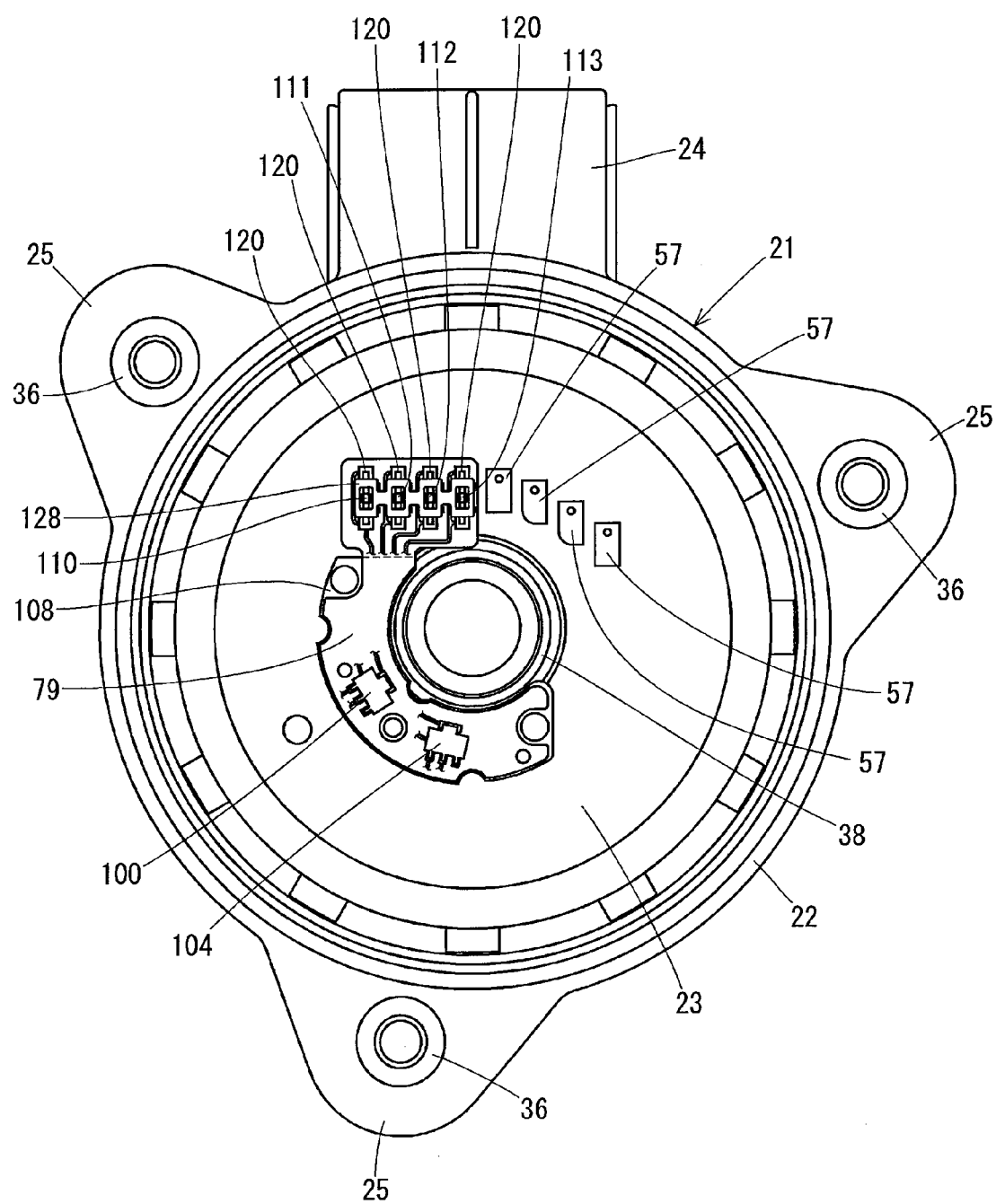
FIG. 2 is a schematic side view of the rotary actuator, when viewed in a direction II in FIG. 1.
Figure 3:
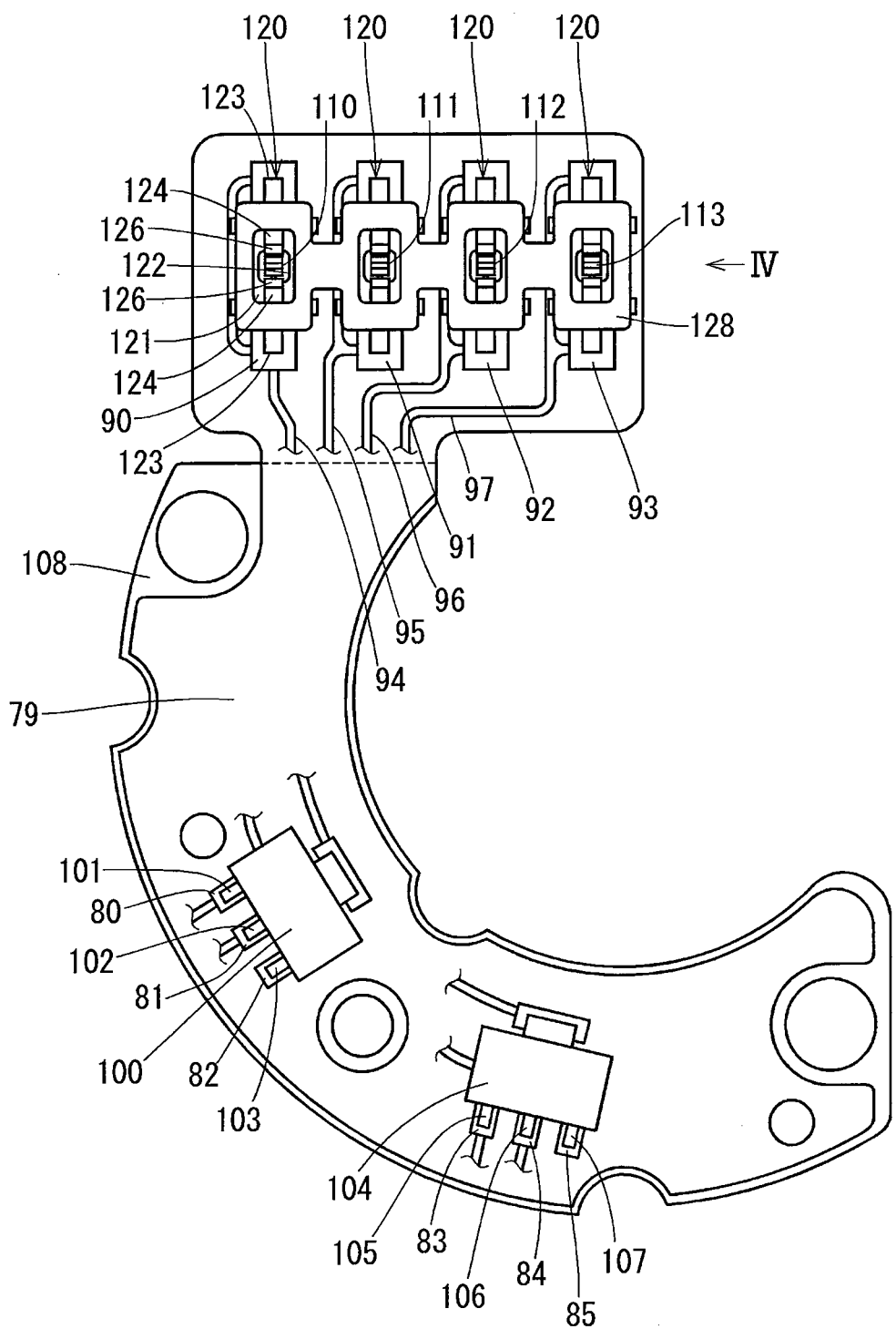
FIG. 3 is a schematic enlarged view showing relevant portions (including terminals, a circuit board, connecting members, holding members and hall ICs) of the rotary actuator.

A rotary actuator and its components according to a first embodiment of the present disclosure are shown in FIGS. 1 and 2. The rotary actuator 10, which is used, for example, as a driving source for a shift-by-wire system, is composed of a housing 20, an electric motor 40, a speed reduction unit 60, an output member 70 and a rotary encoder 77.

The housing 20 is composed of a rear housing 21 and a front housing 30. The rear housing 21 is made of resin and has a cylindrical portion 22, a bottom portion 23, a connector portion 24 and three fixing portions 25. A metal plate 38, which is formed in a cup shape having a bottom, is embedded in the cylindrical portion 22 and the bottom portion 23.

The connector portion 24 includes power pins (not shown), power supply terminals 26 and 27 and signal-output terminals 28 and 29. The power pins are terminals for the electric motor 40. The power supply terminals 26 and 27 and the signal-output terminals 28 and 29 are terminals for the rotary encoder 77. The fixing portions 25 are integrally formed at an outer wall of the cylindrical portion 22.

The front housing 30 is made of resin and likewise has a cylindrical portion 31, a bottom portion 32, an output portion and three fixing portions 34. The cylindrical portion 31 is coaxially arranged with the cylindrical portion 22 of the rear housing 21. A metal plate 39 is embedded in the cylindrical portion 31. The bottom portion 32 closes an axial end of the cylindrical portion 31 at an axial side opposite to the rear housing 21. The output portion 33 is formed in a cylindrical shape projecting at a center of the bottom portion 32 in a direction opposite to the rear housing 21. The output portion 33 is inserted into a casing of an automatic transmission apparatus (not shown). The fixing portions 34 are integrally formed at an outer wall of the cylindrical portion 31.

The front housing 30 is fixed to the rear housing 21 by bolts 64. Each of the bolts 64 passes through an insert collar 37 and is screwed into an insert nut 36. A sealing member 65 is interposed between an open-side surface of the rear housing 21 and an open-side surface of the front housing 30, so as to seal an inside of the housing 20 from the outside.

The electric motor 40, which is a three-phase brushless type motor, is composed of a stator 41 and a rotor 48.

The stator 41 has a stator core 42 and multiple stator coils 45. The stator core 42 has a ring portion 43 fitted into a radial inside wall of the metal plate 38 and multiple teeth portions 44, each of which is projected from the ring portion 43 in a radial inward direction. The teeth portions 44 are composed of, for example, twelve portions arranged in a circumferential direction at equal intervals. The stator core 42 is made of multiple annular plates, which are built up in a thickness direction.

The stator coil 45 is composed of U-phase coil windings, V-phase coil windings and W-phase coil windings, each of which is made of copper wire and wound on each of the teeth portions 44. Each group of the coil windings for the respective phases is composed of, for example, four coil windings. Each of the coil windings is arranged in the circumferential direction in an order of the U-phase coil winding, the V-phase coil winding and the W-phase coil winding.

The stator coil 45 is electrically connected to bus bars 57, which are provided at the inner wall of the bottom portion 23 of the rear housing 21. The bus bars 57 are made of thin metal plates and arranged at the inner wall of the bottom portion 23, so that the bus bars 57 are electrically connected to the power pins (not shown) provided in the connector portion 24. The stator 41 generates magnetic field rotating in the circumferential direction when electric power is sequentially supplied to the respective phase coil windings. The magnetic field is acted on the rotor 48 so as to rotate the rotor 48.

The rotor 48 is arranged in a radial inside of the stator 41 and composed of a rotor shaft 49 and a rotor core 54. One end 50 (a first end) of the rotor shaft 49 on a side of the rear housing 21 is rotatably supported by a rear bearing 59, while the other end 51 (a second end) of the rotor shaft 49 on a side of the front housing 30 is rotatably supported by a front bearing 58.

A core fixing portion 52 and an eccentric portion 53 are respectively form in the rotor shaft 49 between the first end 50 and the second end 51 thereof. As shown in FIG. 1, the first end 50, the core fixing portion 52 and the second end 51 are coaxially arranged with a first shaft center "ϕ1", while the eccentric portion 53 is coaxially arranged with a second shaft center "ϕ2", which is eccentric from the first shaft center "ϕ1".

The rotor core 54 is composed of a boss portion 55 fixed to the rotor shaft 49 by press-fitting to a radial outer surface of the rotor shaft 49 and multiple projecting poles 56, each of which is projected from the boss portion 55 in a radial outward direction. The projecting poles 56 are composed of eight poles arranged in the circumferential direction at equal intervals. The rotor core 54 is made of multiple metal plates, which are built up in a thickness direction.

The speed reduction unit 60 is a kind of planetary gear drive and composed of a ring gear 61 and a sun gear 67.

The ring gear 61 is an internal gear, which is arranged at a radial outer portion of the eccentric portion 53 of the rotor shaft 49 and coaxially with the core fixing portion 52 of the rotor shaft 49. The ring gear 61 is press-inserted into a radial inner wall of the metal plate 39, which is embedded in the cylindrical portion 31 of the front housing 30, so that the ring gear 61 is fixed to the metal plate 39.

The sun gear 67 is an external gear, which is arranged at a radial inner portion of the ring gear 61 so as to be engaged with the ring gear 61. The sun gear 67 is coaxially arranged with the eccentric portion 53 and rotatably supported by middle bearings 69. The middle bearings 69 are fitted to a radial outer wall of the eccentric portion 53.

The sun gear 67 has multiple projections 68 projecting in an axial direction of the rotor shaft 49 and in a direction opposite to the rotor core 54. The projections 68 are formed at equal intervals in a circumferential direction of the sun gear 67. The projections 68 and multiple holes 73 (explained below) constitute a power transmitting unit for transmitting rotation of the sun gear 67 to the output member 70.

The output member 70 has a shaft portion 71 and a flanged portion 72. The shaft portion 71 is coaxially arranged with the second end 51 of the rotor shaft 49 and rotatably supported by a bushing 74. The bushing 74 is inserted into a radial inner wall of the output portion 33 of the front housing 30.

Front bearings 58 are provided in a radial inner wall of the shaft portion 71 on a side of the second end 51 (an axial inner side). An internal tooth (or multiple internal teeth) is formed at a radial inner wall of the shaft portion 71 on an axial outer side. The internal tooth extending in the axial direction is engaged with a member of a device (not shown, but, for example, the automatic transmission apparatus), so as to transmit the rotation of the output member 70 to the device.

The flanged portion 72 is formed at an axial end of the shaft portion 71 on a side to the sun gear 67. The flanged portion 72 has multiple holes 73, each of which is loosely engaged with the respective projections 68 of the sun gear 67. The multiple holes 73 are formed in the circumferential direction of the output member 70 at equal intervals.

The rotary encoder 77 is composed of a magnet 78, a circuit board 79 and hall ICs 100 and 104. The hall ICs 100 and 104 correspond to a rotational angle detecting unit.

The magnet 78 is formed in a ring shape. Multiple N-poles and S-poles are alternately formed in a circumferential direction of the magnet 78. The magnet 78 is coaxially arranged with the rotor core 54 and fixed to an axial end of the rotor core 54 on a side to the rear housing 21.

The circuit board 79 is fixed to the inner wall of the bottom portion 23 of the rear housing 21. The hall ICs 100 and 104 are mounted to the circuit board 79. The hall IC 100 is located at a position displaced by a certain angle from the hall IC 104 in the circumferential direction.

Each of the hall ICs 100 and 104 has a hall element and a signal converting circuit. The hall element is a magneto-electric converting device by use of hall effect for generating electric signal in proportion to magnetic flux density of the magnetic field generated by the magnet 78. The signal converting circuit converts an output signal of the hall element into a digital signal. The hall ICs 100 and 104 generate pulse signals in synchronism with rotation of the rotor core 54.

The pulse signal (an A-phase signal) generated by the hall IC 100 is displaced in phase from the pulse signal (a B-phase signal) generated by the hall IC 104 by ¼ cycle in phase. The two different pulse signals are outputted to an outside device, for example, an encoder board or any other electronic device having the same function to the encoder, via the signal-output terminals 28 and 29, so that the pulse signals are used for detecting a rotational angle as well as a rotational direction of the rotor core 54.

According to the above rotary actuator 10, when the electric power supply to the stator coil 45 is sequentially switched over in the order of the U-phase coil windings, the V-phase coil windings and the W-phase coil windings, the rotor 48 is rotated in one direction of the circumferential direction. In a similar manner, when the electric power supply to the stator coil 45 is sequentially switched over in the order of the W-phase coil windings, the V-phase coil windings and the U-phase coil windings, the rotor 48 is rotated in the opposite direction of the circumferential direction. The rotor 48 is rotated by 45 degrees, each time when the electric power supply to the stator coil 45 is carried out for one cycle (that is, when the electric power supply to the respective U-phase, V-phase and W-phase coil windings is done for one time).

When the rotor 48 is rotated, the sun gear 67 rolls along the internal gear of the ring gear 61 in such a manner that the sun gear 67 rotates around the second shaft center "φ2" of the eccentric portion 53 while the sun gear 67 goes around the first shaft center "φ1" of the core fixing portion 52 of the rotor shaft 49. In the above movement, rotational speed of the sun gear 67 is decreased with respect to rotational speed of the rotor shaft 49. When the sun gear 67 is rotated, the power transmitting unit (the projections 68 and the holes 73) transmits the rotation of the sun gear 67 to the output member 70.

A structure for electrically connecting the hall ICs 100 and 104 to the power supply terminals 26 and 27 and the signal-output terminals 28 and 29 will be explained in detail with reference to FIGS. 1 to 5. The hall IC 100 has a pair of power supply pins 101 and 102 for supplying the electric power to the hall IC 100 and one signal-output pin 103 for outputting the pulse signal. The power supply pins 101 and 102 as well as the signal-output pin 103 are electrically connected to respective lands 80, 81 and 82 of the circuit board 79 for the hall IC 100 by soldering.

In the same manner to the hall IC 100, the hall IC 104 has a pair of power supply pins 105 and 106 for supplying the electric power to the hall IC 104 and one signal-output pin 107 for outputting the pulse signal. The power supply pins 105 and 106 as well as the signal-output pin 107 are electrically connected to respective lands 83, 84 and 85 of the circuit board 79 for the hall IC 104 by soldering.

The circuit board 79 is made of a flexible printed-circuit board and fixed to a metal reinforcing plate 108. The metal reinforcing plate 108 is fixed to the inner wall of the bottom portion 23 of the rear housing 21 by, for example, thermal caulking.

Figure 4:
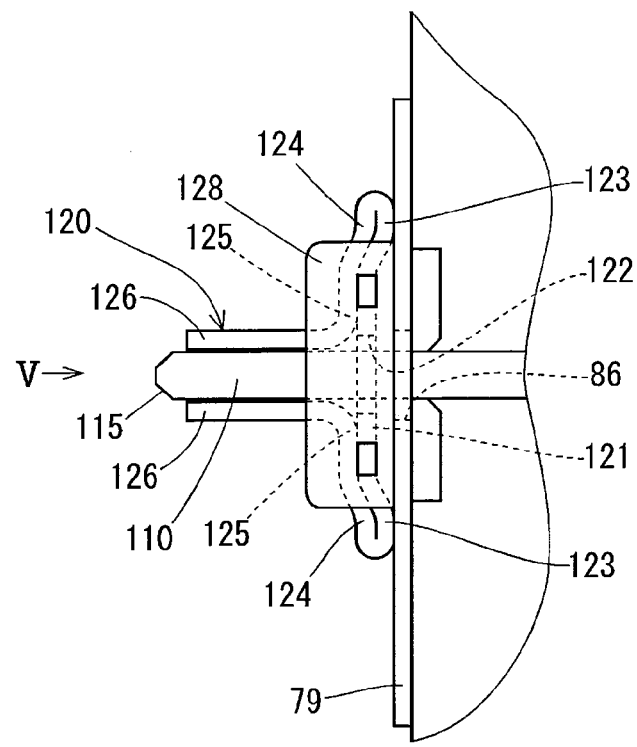
FIG. 4 is a schematic side view of the relevant portions of the rotary actuator, when viewed in a direction IV in FIG. 3.
Figure 11:
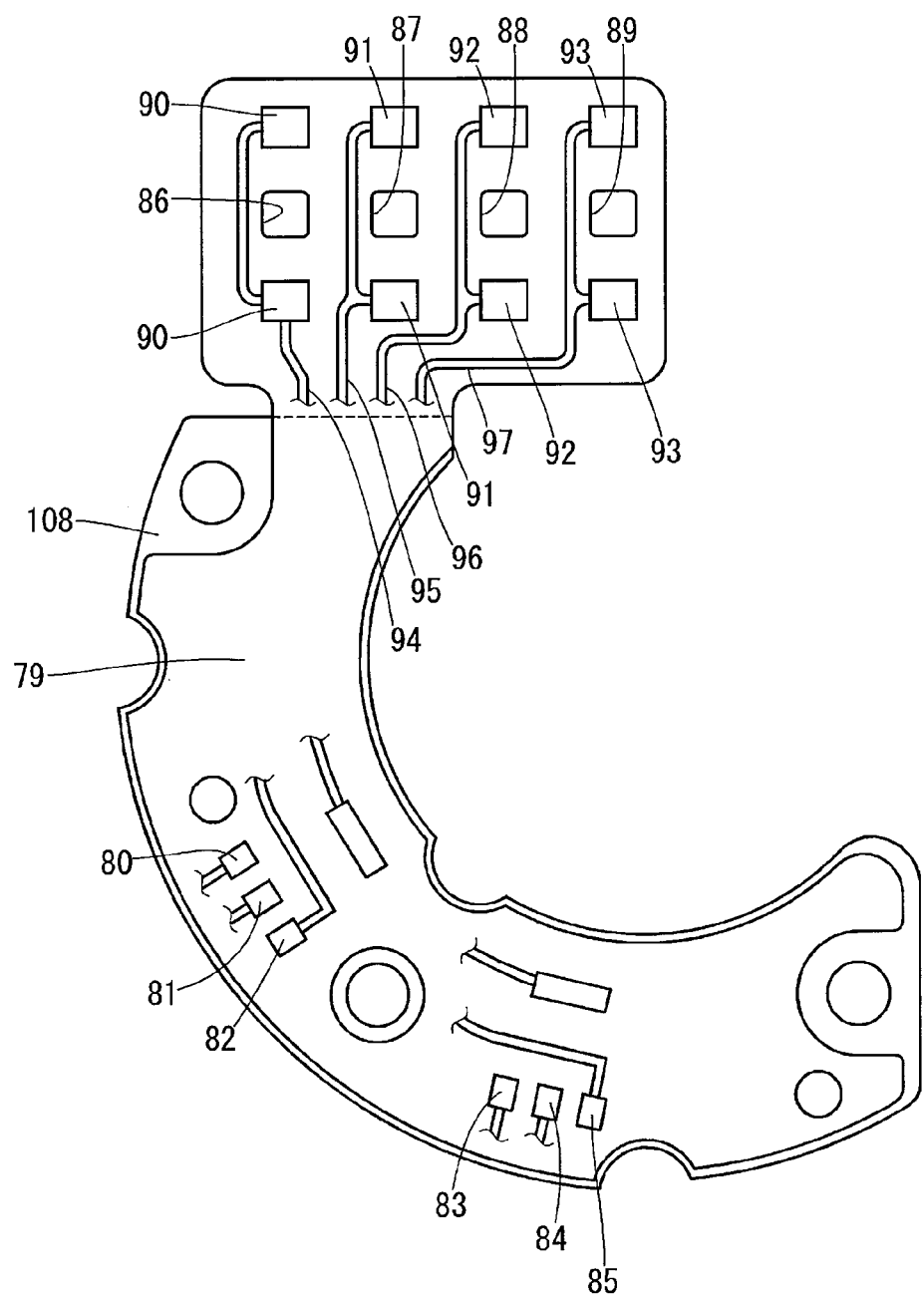
FIG. 11 is a schematic view showing the circuit board in a soldering step (a fourth step) of FIG. 6, before the connecting members are connected to the circuit board.

The circuit board 79 has four through-holes 86, 87, 88 and 89 (FIG. 4 and FIG. 11). A pair of fixing lands 90, which are formed in an area close to the through-hole 86 and at opposite sides to each other across the through-hole 86, are connected to the power supply pins 101 and 105 via a printed wire 94. In a similar manner, a pair of fixing lands 91, which are formed in an area close to the through-hole 87 and at opposite sides to each other across the through-hole 87, are connected to the power supply pins 102 and 106 via a printed wire 95. A pair of fixing lands 92, which are formed in an area close to the through-hole 88 and at opposite sides to each other across the through-hole 88, are connected to the signal-output pin 103 of the hall IC 100 via a printed wire 96. And a pair of fixing lands 93, which are formed in an area close to the through-hole 89 and at opposite sides to each other across the through-hole 89, are connected to the signal-output pin 107 of the hall IC 104 via a printed wire 97.

Terminals 110, 111, 112 and 113 are respectively inserted into each of the through-holes 86, 87, 88 and 89.

Each one end of the terminals 110 to 113 is bent so as to extend in a direction from the inner wall of the bottom portion 23 of the rear housing 21 toward the circuit board 79. Each body portion of the terminals 110 to 113 is arranged in a space of the bottom portion 23 of the rear housing 21 so as to extend in a radial direction of the rear housing 21 to the connector portion 24. Each of the other ends of terminals 110 to 113 is respectively connected to the power supply terminals 26 and 27 and the signal-output terminals 28 and 29.

Each one end of the terminals 110 to 113 is electrically connected to the respective fixing lands 90 to 93 by each connecting member 120. Each of the connecting members 120 is provided on a side of the circuit board 79 opposite to the inner wall of the bottom portion 23.

Each connecting member 120 is made of metal and has a base portion 121, a pair of leg portions 123, a pair of deformation suppressing portions 124 and a pair of holding portions 126, which are integrally formed from one metal sheet. Hereinafter, the connecting member 120 for electrically connecting the terminal 110 to the fixing lands 90 will be explained as an example.

Figure 5:
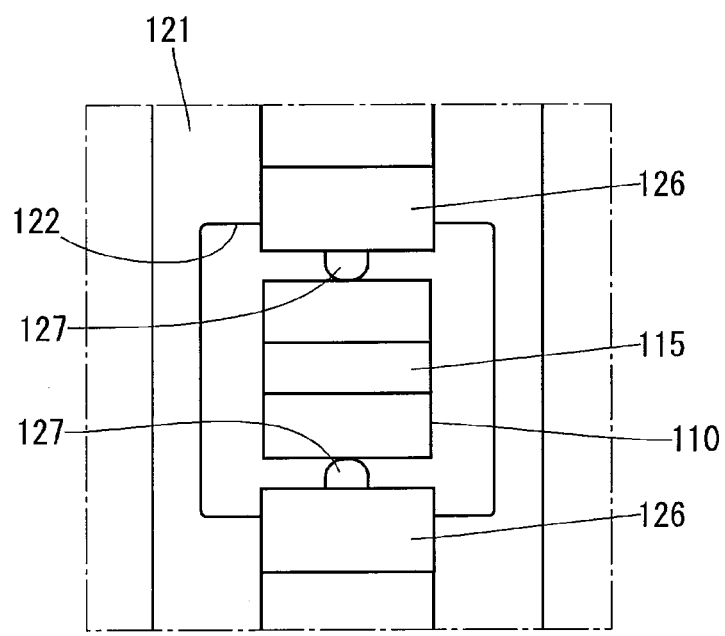
FIG. 5 is a schematic view showing the terminal and holding portions of the coupling member, when viewed in a direction V in FIG. 4.
Figure 8:
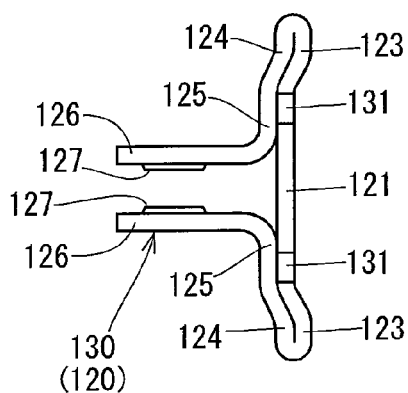
FIG. 8 is a schematic view showing the intermediate product when viewed in a direction VIII in FIG. 7.

As best shown in FIGS. 4, 5 and 8, the base portion 121 is formed in a circular shape and has a through-hole 122, through which the terminal 110 is inserted.

Each of the leg portions 123 extends from an outer periphery of the base portion 121 in a radial outward direction and fixed to the respective lands 90 by soldering. The leg portions 123 are arranged at both sides of the base portion 121 across the through-hole 122.

Each of the deformation suppressing portions 124 is formed at a side of the leg portion 123 opposite to the circuit board 79. The deformation suppressing portion 124 extends from an outer-side end of the leg portion 123 in a direction toward the terminal 110. An inner-side end 125 of the deformation suppressing portion 124 is in contact with the base portion 121. The deformation suppressing portion suppresses transmission of deformation of the holding portion 126 to the leg portion 123.

Each of the holding portions 126 extends from the inner-side end 125 of the deformation suppressing portion 124 along the terminal 110 toward a forward end 115 of the terminal 110. The holding portion 126 is elastically deformable in a direction toward or away from the terminal 110. The holding portions 126 are arranged at both sides of the terminal 110.

The connecting member 120 is mounted to the circuit board 79 by reflow-soldering together with the hall ICs 100 and 104.

When the terminal 110 is inserted through a space between the pair of the holding portions 126, the holding portions 126 are pressed apart from each other against their elastic forces. Each of the holding portions 126 is, therefore, pressed against the terminal 110 by its elastic force in order to hold the terminal 110 in its position. As above, it is possible to electrically connect the terminal 110 to the fixing lands 90 by simply fitting the connecting member 120 to the terminal 110. In the above process, it is not necessary to add any other special process for separating the pair of the holding portions 126 from each other. It is, therefore, possible to assemble the connecting member 120 to the terminal 110 by a one-touch process.

As shown in FIGS. 5 and 8, each of the holding portions 126 has a projection 127 extending in a direction along the terminal 110 on a side wall of the holding portion 126 facing to the terminal 110. The projection 127 has a curved surface in a horizontal cross section. According to such a shape of the projection, the holding portion 126 of the connecting member 120 can keep its contacting condition with the terminal 110, even when the connecting member 120 is inclined with respect to the terminal 110.

In addition, the projection 127 can slide on the terminal 110. It is, therefore, possible to move the connecting member 120 relative to the terminal 110 in a direction in which the terminal 110 extends, while the contact between the holding portion 126 and the terminal 110 is maintained.

The multiple connecting members 120 are coupled together by a coupling member 128 made of resin (insulating material), wherein the connecting members 120 are electrically insulated from each other. The coupling member 128 firmly supports the leg portions 123 and the deformation suppressing portions 124 of the connecting member 120, so that the transmission of the deformation of the holding portion 126 to the leg portions 123 can be furthermore suppressed.

A manufacturing method for the rotary actuator 10, in particular, steps for manufacturing the connecting members 120 and the coupling member 128 and a step for assembling them to the circuit board 79, will be explained with reference to FIGS. 6 to 12.

Figure 6:
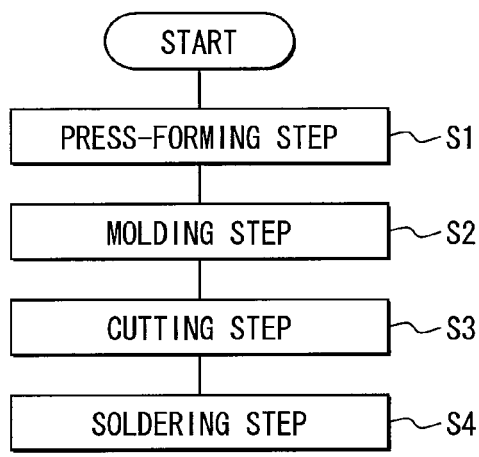
FIG. 6 is a process chart showing manufacturing steps for the connecting members and the coupling member and an assembling step for assembling those members to the circuit board.

As shown in FIG. 6, the connecting members 120 and the coupling member 128 are manufactured and mounted to the circuit board 79 in accordance with a first press-forming step S1, a second molding step S2, a third cutting step S3 and a fourth soldering step S4.

Figure 7:
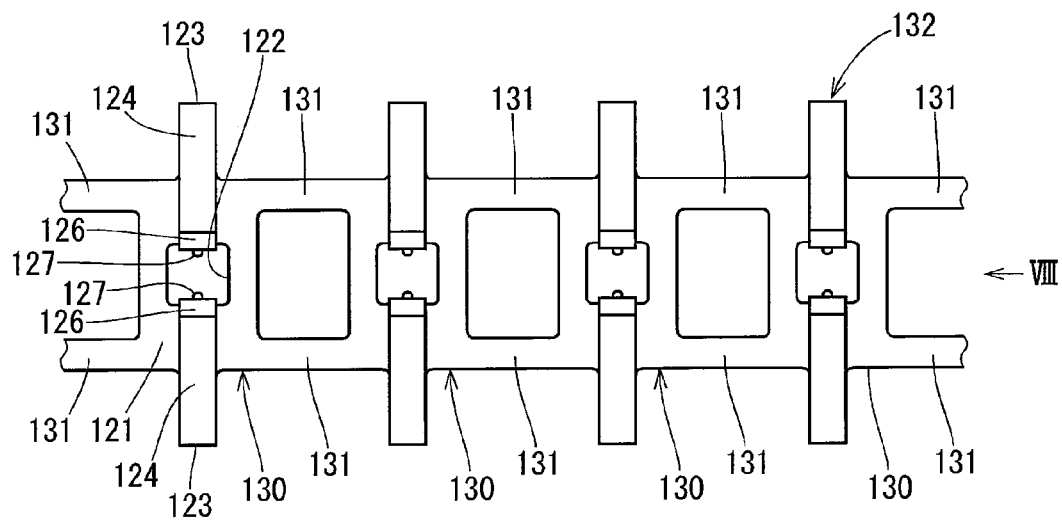
FIG. 7 is a schematic view showing an intermediate product manufactured in a first step of FIG. 6.

In the first press-forming step S1 of FIG. 6, an intermediate product 132 is manufactured from a sheet of metal by a press-forming process. More in detail, as shown in FIGS. 7 and 8, the metal sheet is punched out and the leg portions 123, the deformation suppressing portions 124 and the holding portions are bent, so that the intermediate product 132 is shaped as shown in FIGS. 7 and 8. The intermediate product 132 has multiple connecting-member portions 130 (corresponding to the connecting member 120), which are continuously connected by bridging portions 131.

Figure 9:
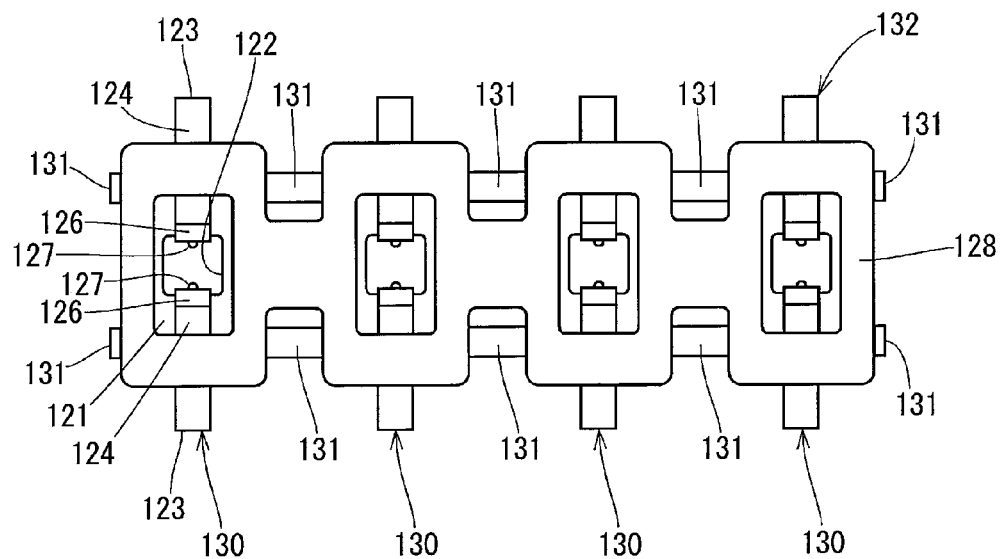
FIG. 9 is a schematic view showing the connecting members and the coupling member manufactured in a second step of FIG. 6.

Then, in the second molding step S2, as shown in FIG. 9, the intermediate product 132 and the coupling member 128 are integrally formed by an insert-molding process, wherein at least a portion of each bridging portion 131 is exposed to the outside (in other words, the bridging portions 131 are not covered by molded resin for the coupling member 128).

In the next cutting step S3 of FIG. 6, the bridging portions 131, which are exposed to the outside as shown in FIG. 9, are cut away so that each of the connecting-member portions 130 are electrically insulted from each other. Then, as shown in FIG. 10, the multiple connecting-member portions 130, that is the multiple connecting members 120, are coupled together by the coupling member 128, wherein the connecting members 120 are electrically insulated from each other.

Figure 10:
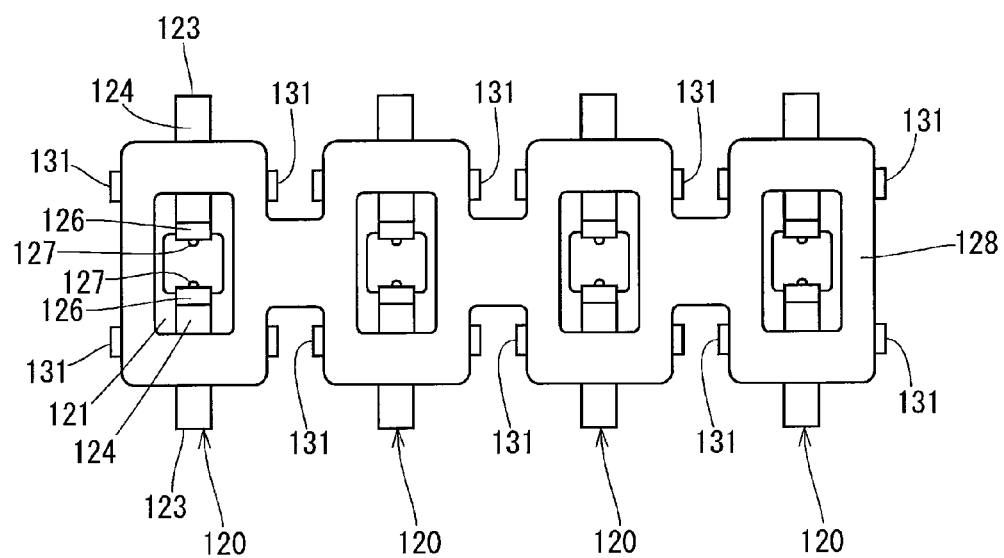
FIG. 10 is a schematic view showing the connecting members and the coupling member manufactured in a third step of FIG. 6.
Figure 12:
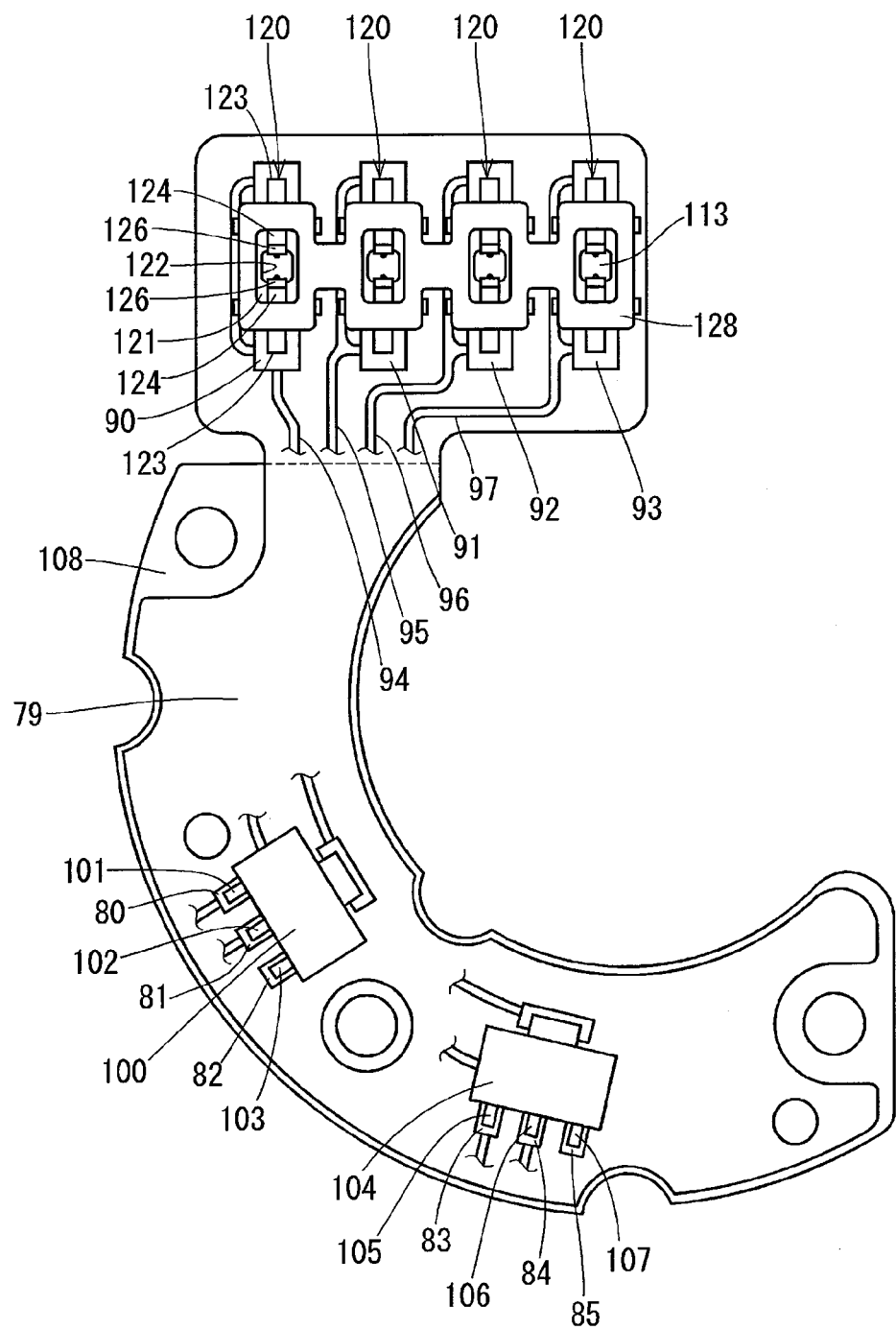
FIG. 12 is a schematic view showing the circuit board, to which the connecting members and hall ICs are soldered in the soldering step of FIG. 6.

In the fourth soldering step S4 of FIG. 6, the hall ICs 100 and 104 and the connecting members 120 of FIG. 10 are mounted to the circuit board 79 shown in FIG. 11 by the reflow-soldering process. FIG. 12 shows the circuit board 79, to which the hall ICs 100 and 104 as well as the multiple connecting members 120 are mounted.

As explained above, according to the rotary actuator 10 of the first embodiment, the circuit board 79, to which the hall ICs 100 and 104 are mounted, has the printed wires 94 to 96 connected to the respective pins 101 to 103 of the hall IC 100 as well as the printed wires 94, 95 and 97 connected to the respective pins 105 to 107 of the hall IC 104. Each one end of the terminals 110 to 113 is bent to extend from the inner wall of the bottom portion 23 of the rear housing 21 toward the circuit board 79, so that each end of the terminals 110 to 113 is inserted through the respective through-holes 86 to 89 of the circuit board 79. Each of the connecting members 120 is arranged at the side of the circuit board 79 opposite to the inner wall of the bottom portion 23, so as to electrically connect the terminals 110 to 113 to the respective fixing lands 90 to 93 formed adjacent to the through-holes 86 to 89.

Each of the connecting members 120 is composed of the base portion 121, the pair of leg portions 123, the pair of deformation suppressing portions 124 and the pair of holding portions 126. Each of the terminals 110 to 113 is inserted through the through-hole 122 formed in the base portion 121. Each of the leg portions 123 extends from the base portion 121 in the radial outward direction (in the opposite direction to each other) and is fixed to the respective fixing lands 90 to 93 of the circuit board 79 by soldering.

Each of the deformation suppressing portions 124 is arranged at the position of the leg portion 123 at the side opposite to the circuit board 79 and extends from the outer-side end of the leg portion 123 toward each of the terminals 110 to 113. Each of the holding portions 126 extends from the inner-side end 125 of the deformation suppressing portion 124 toward the forward end 115 of the respective terminals 110 to 113 in the direction along the corresponding terminal. The pair of holding portions 126 holds the corresponding terminal between them to elastically hold it.

According to the above structure, when the circuit board 79 is assembled to the rear housing 21, the connecting members 120 are already fixed to the circuit board 79. Therefore, each of the terminals 110 to 113 is simply inserted through the corresponding space between the pair of the holding portions 126, so that the electrical connection between the terminals 110 to 113 and the circuit board 79 is completed. As above, the circuit board 79 can be assembled to the rear housing 21 in a simple manner and in a short time.

The connecting members 120 are mounted to the circuit board 79 at the same time when the hall ICs 100 and 104 are mounted to the circuit board 79 by the reflow soldering. Therefore, a number of manufacturing steps is not increased, even when the connecting members 120 are additionally mounted to the circuit board 79.

The deformation suppressing portions 124 are formed between the holding portions 126 and the leg portions 123. Therefore, the deformation of the holding portions 126 is hardly transmitted to the leg portions 123. It is possible to avoid such a situation that the leg portions 123 may be separated from the circuit board 79 by the deformation force transmitted from the holding portions 126 to the leg portions 123.

The inner-side ends 125 of the deformation suppressing portions 124 are bent in such a way that the inner-side ends 125 are brought into contact with the base portion 121. In addition, the coupling member 128 is fixed to the connecting members 120 in such a manner that the deformation suppressing portions 124 and the leg portions 123 are firmly fixed to each other so that they are not allowed to move relative to each other. Accordingly, the deformation force at the holding portions 126 are hardly transmitted to the portions of the leg portions 123, at which the leg portions 123 are soldered to the circuit board 79.

The coupling member 128 is made of resin (the insulating material) so as to couple the connecting members 120 to each other in the electrically insulated manner. It is, therefore, possible to accurately locate each of the connecting members 120 in their positions.

The holding portions 126 of the connecting member 120 can slide on the corresponding terminal 110 to 113 in the extending direction of the terminal. In other words, the connecting member 120 is movable relative to the terminal 110 to 113 in the extending direction of the terminal. Therefore, even in a case a relative position between the rear housing 21 and the circuit board 79 is changed due to thermal expansion or the like, it is possible to avoid a situation that a stress is applied to the portion of the leg portions 123 at which the leg portions 123 are soldered to the circuit board 79.

When each of the terminals 110 to 113 is inserted through the space between the pair of the holding portions 126, the holding portions 126 are pressed apart from each other against their elastic forces. It is, therefore, not necessary to add any special process for separating the pair of the holding portions 126 from each other. The terminals 110 to 113 can be electrically connected to the fixing lands 94 to 97 by simply fitting the connecting members 120 to the respective terminals 110 to 113. In other words, the connecting members 120 can be assembled to the respective terminals 110 to 113 by the one-touch process.

According to the manufacturing method of the above embodiment for the connecting members 120 and the coupling member 128, the intermediate product 132 is manufactured at the step S1. In the intermediate product 132, the multiple connecting-member portions 130 (which will be the connecting member 120) are connected by the bridging portions 131. Then, at the step S2, the intermediate product 132 is integrally molded with the holding member 128, wherein the bridging portions 131 are exposed to the outside. At the step S3, the bridging portions 131 exposed to the outside are cut away, so that each of the connecting-member portions 130 are electrically separated from each other. As above, the multiple connecting members 120 can be accurately positioned.

Second Embodiment

Figure 13:
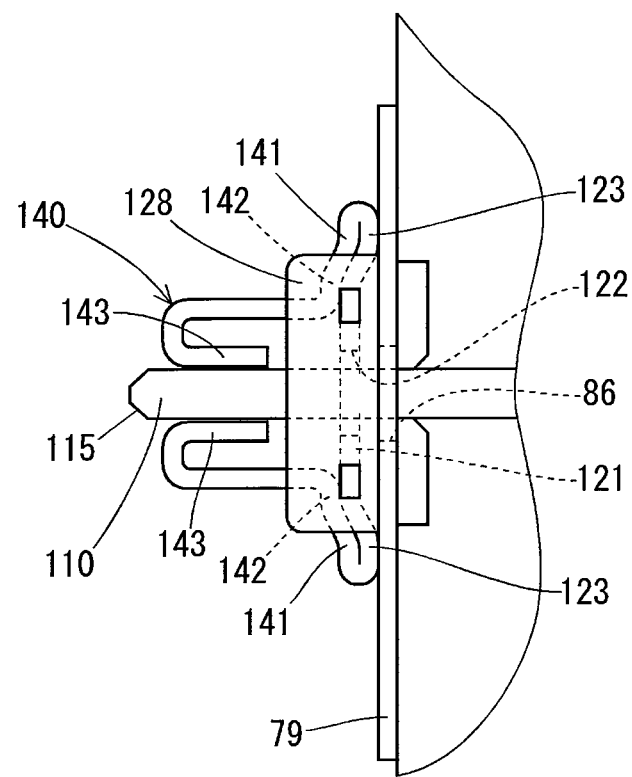
FIG. 13 is a schematic view showing connecting members of a rotary actuator according to a second embodiment of the present disclosure.

A rotary actuator according to a second embodiment is shown in FIG. 13. A deformation suppressing portion 141 of a connecting member 140 is bent in such a manner that an inner-side end 142 thereof is brought into contact with the leg portion 123.

A holding portion 143 extends from the inner-side end 142 in a direction parallel to the extending direction of the terminal 110 and is inwardly bent in a U-shape at a portion close to the forward end 115 of the terminal 110. Each of forward ends of the holding portions 143 is biased against the terminal 110 from both sides thereof. The same effects and/or advantages of the first embodiment can be obtained in the second embodiment.

Other Embodiments and/or Modifications

Any other types of a magnetic-type rotational angle detecting unit, other than the hall ICs, may be used in the rotary actuator of the present disclosure.

An optical-type rotational angle detecting unit may be used instead of the magnetic-type unit.

A number of the hall ICs mounted to the circuit board may be one or more than two.

A number of the pins for the hall IC may not be limited to three.

A number of the terminals, which extend from the inner wall of the rear housing toward the circuit board, is not limited to four, but may be less than or more than four.

The terminals, which extend from the inner wall of the rear housing toward the circuit board, may not be necessarily arranged in a straight line. The terminals may be arranged in a zig-zag manner.

A number of the connecting members may be less than or more than four.

The coupling member may not necessarily couple the multiple connecting members with each other.

The coupling member may be made of material other than resin.

The coupling member is not always necessary.

The pair of holding portions may not necessarily slide on the terminal.

The inner-side end of the deformation suppressing portion may not be always brought into contact with the base portion and/or the leg portion.

When the connecting member is fitted to the terminal, the pair of holding portions may be separated from each other by any specific structure or step.

The connecting member may be manufactured by one by one.

The rotor of the electric motor is not limited to an inner-rotor type but an outer-rotor type motor may be used.

The rotary actuator may be used not only in the shift-by-wire system but also in any other apparatus or systems.

The speed reduction unit may not be always necessary.

The present disclosure should not be limited to the above embodiments and/or modifications but may be modified in various manners without departing from spirits of the present disclosure.

What is claimed is:

1. A rotary actuator comprising:
a rotor;
a stator for generating magnetic field acted on the rotor for rotating the rotor;
a housing for rotatably supporting the rotor and for firmly supporting the stator;
a rotational angle detecting unit for detecting rotational angle of the rotor upon receiving electric power;
a circuit board fixed to the housing and having a wire connected to the rotational angle detecting unit, which is mounted to the circuit board;
a terminal extending from an inner wall of the housing toward the circuit board and inserted through a through-hole formed in the circuit board; and
a connecting member provided at a side of the circuit board opposite to the inner wall of the housing for electrically connecting the terminal to the wire,
wherein the connecting member is composed of:
a base portion through which the terminal is inserted;
a pair of leg portions integrally formed with the base portion at an outer periphery of the base portion, the leg portions being electrically connected to the wire;
a pair of deformation suppressing portions formed at a side of the leg portions opposite to the base portion, each of the deformation suppressing portions being extending from the leg portion toward the terminal; and
a pair of holding portions, each holding portion extending from an inner-side end of the deformation suppressing portion toward a forward end of the terminal, for elastically holding the terminal between them.

2. The rotary actuator according to claim 1, wherein the inner-side end of the deformation suppressing portion is in contact with the base portion and/or the leg portion.

3. The rotary actuator according to claim 1, further comprising:
a coupling member attached to the connecting member for firmly holding the deformation suppressing portion and the leg portion, so that they are not allowed to move relative to each other.

4. The rotary actuator according to claim 3, wherein the coupling member is made of insulating material for coupling multiple connecting members with each other in an electrically insulated manner.

5. The rotary actuator according to claim 1, wherein the pair of the holding portions movably hold the terminal so that the holding portion slides with respect to the terminal in a direction, in which the terminal extends.

6. The rotary actuator according to claim 1, wherein the holding portions are pressed apart from each other against elastic forces of the holding portions, when the terminal is inserted into a space between the holding portions.

7. The rotary actuator according to claim 1, wherein each of the holding portions has a projection projecting in direction to the terminal,
wherein the projection has a curved surface in a horizontal cross section.

8. The rotary actuator according to claim 7, wherein the projection extends in a direction, in which the terminal extends.

9. The rotary actuator according to claim 1, wherein each of the holding portions has a U-shape portion at a portion close to the forward end of the terminal.

10. A method for manufacturing the rotary actuator according to claim 4, comprising:
a first step for forming an intermediate product from a sheet of metal, the intermediate product having multiple connecting-member portions and multiple bridging portions connecting the connecting-member portions with each other;
a second step for integrally molding the intermediate product with the coupling member, wherein at least a portion of each bridging portion is exposed to outside; and
a third step for cutting away the bridging portions exposed to the outside, so that the connecting-member portions are separated from each other to respectively form the independent connecting members, which are electrically insulated from each other.

* * * * *